United States Patent
Tohara et al.

(10) Patent No.: US 9,274,405 B2
(45) Date of Patent: Mar. 1, 2016

(54) PROJECTOR WITH ILLUMINATION SYSTEM HAVING A CUBOID OPTICAL MEMBER

(71) Applicant: CANON KABUSHIKI KAISHA, Tokyo (JP)

(72) Inventors: Masakazu Tohara, Komae (JP); Takashi Urakawa, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 114 days.

(21) Appl. No.: 14/139,082

(22) Filed: Dec. 23, 2013

(65) Prior Publication Data

US 2014/0185018 A1 Jul. 3, 2014

(30) Foreign Application Priority Data

Dec. 28, 2012 (JP) .................................. 2012-288563

(51) Int. Cl.
| | |
|---|---|
| G03B 21/14 | (2006.01) |
| G03B 21/20 | (2006.01) |
| G03B 33/12 | (2006.01) |
| H04N 9/31 | (2006.01) |
| G02B 27/28 | (2006.01) |
| G03B 21/00 | (2006.01) |

(52) U.S. Cl.
CPC .......... *G03B 21/2033* (2013.01); *G03B 21/208* (2013.01); *G03B 21/2066* (2013.01); *G03B 33/12* (2013.01); *H04N 9/3152* (2013.01); *G02B 27/283* (2013.01); *G03B 21/008* (2013.01)

(58) Field of Classification Search
CPC .. G03B 21/16; G03B 21/145; G03B 21/2073; G02B 27/283

USPC ............ 353/30, 31, 37, 38, 99, 102; 359/629, 359/640, 636, 834; 348/743–747
See application file for complete search history.

(56) References Cited

U.S. PATENT DOCUMENTS

| | | | |
|---|---|---|---|
| 7,887,198 B2 | 2/2011 | Yokote | |
| 2004/0032569 A1* | 2/2004 | Takezawa | G02B 7/008 353/31 |
| 2006/0044523 A1* | 3/2006 | Teijido et al. | 353/53 |
| 2006/0132725 A1* | 6/2006 | Terada | G02B 27/102 353/102 |
| 2007/0001104 A1 | 1/2007 | Yokote | |
| 2007/0121085 A1* | 5/2007 | Dewald | 353/99 |
| 2007/0146639 A1* | 6/2007 | Conner | 353/20 |
| 2007/0195278 A1* | 8/2007 | Yokote et al. | 353/34 |
| 2008/0158520 A1* | 7/2008 | Hsu | 353/84 |
| 2009/0033878 A1* | 2/2009 | Shirai et al. | 353/37 |
| 2014/0185017 A1 | 7/2014 | Tohara | |

FOREIGN PATENT DOCUMENTS

JP 2007-041546 A 2/2007

* cited by examiner

*Primary Examiner* — Sultan Chowdhury
(74) *Attorney, Agent, or Firm* — Fitzpatrick, Cella, Harper & Scinto

(57) ABSTRACT

A projector includes an area light source, a spatial light modulator, an illumination system that receives light from the area light source and illuminates the spatial light modulator, and a projection lens that forms an image by the light from the spatial light modulator. The illumination system includes an optical member having a cuboid shape and including an entrance plane and an exit plane, the optical member being arranged so that the entrance plane faces the area light source, and the optical member forming, on the exit plane, an illuminance distribution having a higher illuminance at a peripheral portion than at a central portion. The spatial light modulator is illuminated with the light from the exit plane.

8 Claims, 10 Drawing Sheets

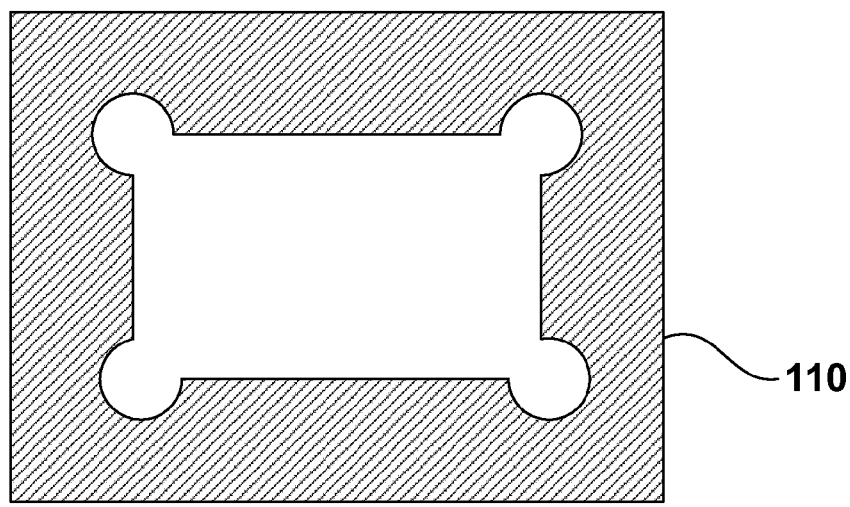
F I G. 7A
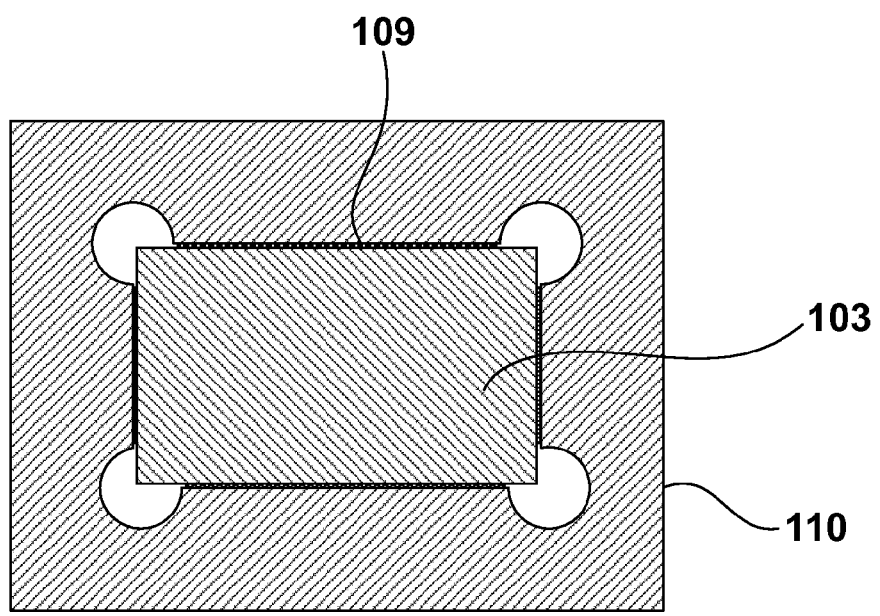
F I G. 7B

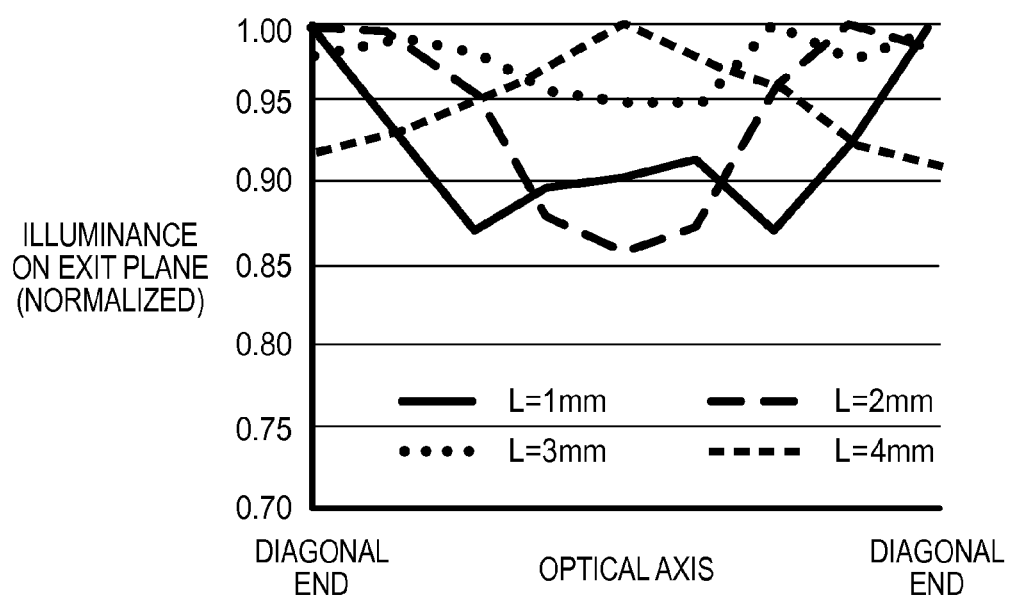
F I G. 14

PROJECTOR WITH ILLUMINATION SYSTEM HAVING A CUBOID OPTICAL MEMBER

BACKGROUND OF THE INVENTION

1. Field of the Invention

The present invention relates to a projector.

2. Description of the Related Art

In a projector, light falloff at edges can occur due to the characteristic of a projection lens that projects an image onto a screen. Japanese Patent Laid-Open No. 2007-41546 describes an optical system apparatus having an arrangement configured to uniform the illuminance distribution of an image projected onto a screen while suppressing the cost of a projection lens. The optical system apparatus described in Japanese Patent Laid-Open No. 2007-41546 includes a tapered rod that increases the sectional area as the distance from an LED (Light Emitting Diode) increases, and a light guide member for guiding light that has exited from the tapered rod to a liquid crystal panel. Providing the tapered rod makes it possible to illuminate the peripheral portion of the liquid crystal panel brighter than the optical axis portion.

In the arrangement described in Japanese Patent Laid-Open No. 2007-41546, the tapered rod and the light guide unit are arranged between the LED and the liquid crystal panel. Since the distance between the LED (light source) and the liquid crystal panel (spatial light modulator) becomes long, downsizing of the optical system apparatus may be impeded.

SUMMARY OF THE INVENTION

The present invention provides a technique advantageous in shortening the distance between a light source and a spatial light modulator.

One of aspects of the present invention provides a projector including an area light source, a spatial light modulator, an illumination system that receives light from the area light source and illuminates the spatial light modulator, and a projection lens that forms an image by the light from the spatial light modulator, wherein the illumination system includes an optical member having a cuboid shape and including an entrance plane and an exit plane, the optical member being arranged so that the entrance plane faces the area light source, and the optical member forming, on the exit plane, an illuminance distribution having a higher illuminance at a peripheral portion than at a central portion, and wherein the spatial light modulator is illuminated with the light from the exit plane.

Further features of the present invention will become apparent from the following description of exemplary embodiments with reference to the attached drawings.

BRIEF DESCRIPTION OF THE DRAWINGS

FIGS. 7A and 7B are views showing the modification of the first embodiment;

FIG. 14 is a graph for explaining the first embodiment.

DESCRIPTION OF THE EMBODIMENTS

Several embodiments of the present invention will now be described with reference to the accompanying drawings.

Figure 1:
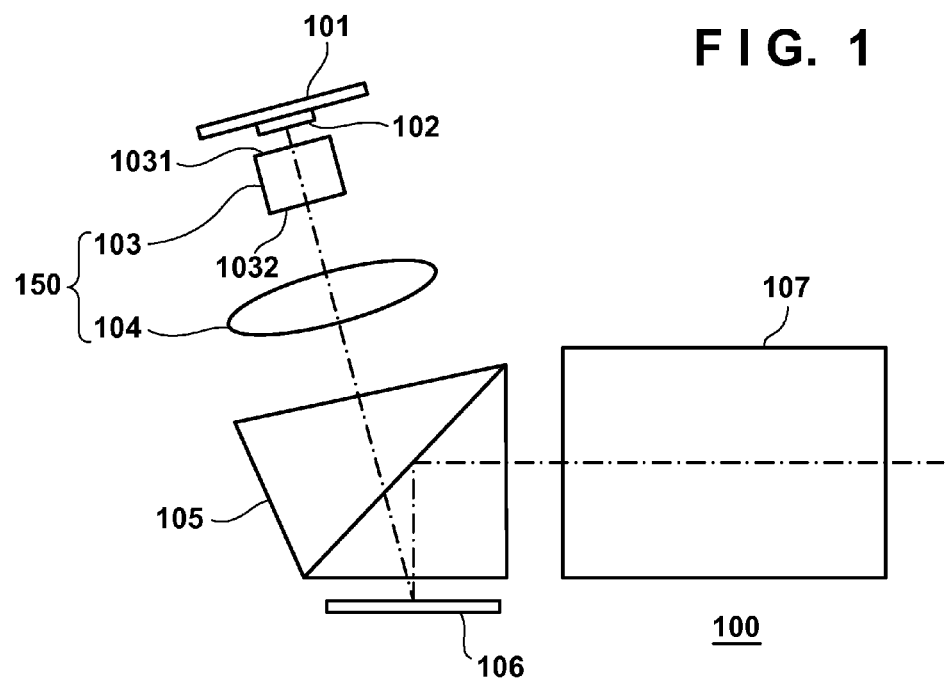
FIG. 1 is a view showing the schematic arrangement of a projector according to the first embodiment.

FIG. 1 shows the schematic arrangement of a projector 100 according to the first embodiment of the present invention. The projector 100 can include an area light source 102, a spatial light modulator 106, an illumination system 150 that receives light from the area light source 102 and illuminates the spatial light modulator 106, and a projection lens 107 that forms, on a screen, an image by the light from the spatial light modulator 106.

The area light source 102 can be, for example, the light emitting region of a light emitting device 101 such as an LED but may be the image of the light emitting region. The image of the light emitting region can be formed at a position (image plane) conjugate to the light emitting region (object plane) of the light emitting device 101 by an optical system (not shown). The area light source 102 has, for example, a rectangular shape. The spatial light modulator 106 can be, for example, a device such as a DMD (Digital Mirror Device). The illumination system 150 can include an optical member 103 and a relay lens 104. The optical member 103 has a cuboid shape and includes an entrance plane 1031 and an exit plane 1032. The optical member 103 is arranged while making the entrance plane 1031 face the area light source 102, and forms, on the exit plane 1032, an illuminance distribution having a higher illuminance at the peripheral portion than at the central portion. The relay lens 104 illuminates the spatial light modulator 106 with the light from the exit plane 1032 of the optical member 103. The projection lens 107 projects an image by the light from the spatial light modulator 106 onto the screen.

The projector 100 may include a TIR (Total Internal Reflection) prism 105. The TIR prism 105 is formed by bonding two triangular prisms at a very small air gap. The TIR prism 105 transmits light from the relay lens 104, and reflects the light reflected by the spatial light modulator 106 by the interface between the two triangular prisms.

In the first design example that is one design example of the first embodiment, the size of the area light source 102 is 3.2×2.4 mm. In addition, the size of the entrance plane 1031 of the optical member 103 is 3.6×2.7 mm, the length of the optical member 103 (the distance between the entrance plane 1031 and the exit plane 1032) is 3 mm, and the refractive index of the optical member 103 is 1.517. The equivalent air distance between the area light source 102 and the optical member 103 is 1 mm.

Conventionally, a rod integrator (corresponding to the tapered rod in Japanese Patent Laid-Open No. 2007-41546) is arranged between the area light source 102 and the spatial light modulator 106. When the rod integrator is sufficiently long, the number of times of refection in the rod integrator can be increased, and the illuminance distribution on the exit plane can be uniformed. In the first embodiment, since the optical member 103 arranged between the area light source 102 and the spatial light modulator 106 is made short, the illuminance distribution on the exit plane 1032 has a higher illuminance at the peripheral portion than at the central portion. The spatial light modulator 106 is thus illuminated with the illuminance distribution having a higher illuminance at the peripheral portion than at the central portion.

Figure 2A:
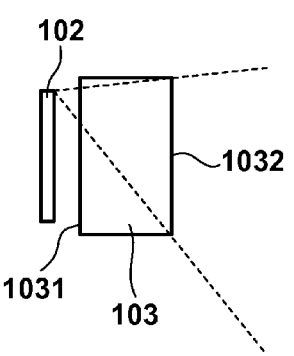
FIGS. 2A to 2C are views for explaining the first embodiment.
Figure 2B:
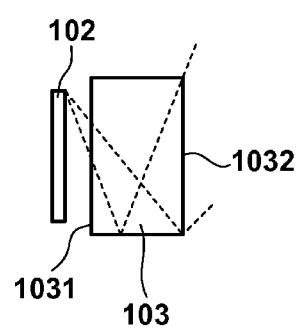
Figure 2C:
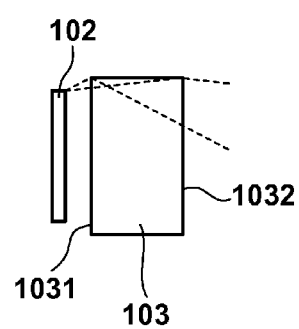

The relationship between the length of the optical member 103 (the distance between the entrance plane 1031 and the exit plane 1032) and the illuminance distribution formed on the exit plane 1032 of the optical member 103 will be described below. FIGS. 2A to 2C illustrate the routes of light from a position close to the upper end of the area light source 102 when the optical member 103 is short. FIG. 2A shows the route of light that enters the entrance plane 1031 of the optical member 103 and travels toward the exit plane 1032 of the optical member 103 without being reflected by any side surface of the optical member 103 at all. FIGS. 2B and 2C show the routes of light that enters the entrance plane 1031 of the optical member 103 and travels toward the exit plane 1032 of the optical member 103 after being reflected by a side surface of the optical member 103 only once.

As is apparent from FIG. 2A, out of the light that is emitted from the position close to the upper end of the area light source 102 and enters the entrance plane 1031 of the optical member 103, light components that are not reflected by any side surface of the optical member 103 reach the whole area of the exit plane 1032. Additionally, as is apparent from FIG. 2B, out of the light that is emitted from the position close to the upper end of the area light source 102 and enters the entrance plane 1031 of the optical member 103, light components that are reflected by the lower side surface of the optical member 103 only once reach the whole area of the exit plane 1032. However, as is apparent from FIG. 2C, light components that are emitted from the position close to the upper end of the area light source 102, enter the entrance plane 1031, and are reflected by the upper side surface of the optical member 103 reach only a partial area of the exit plane 1032. Hence, the illuminance distribution on the exit plane 1032 of the optical member 103 is not uniform.

Figure 3A:
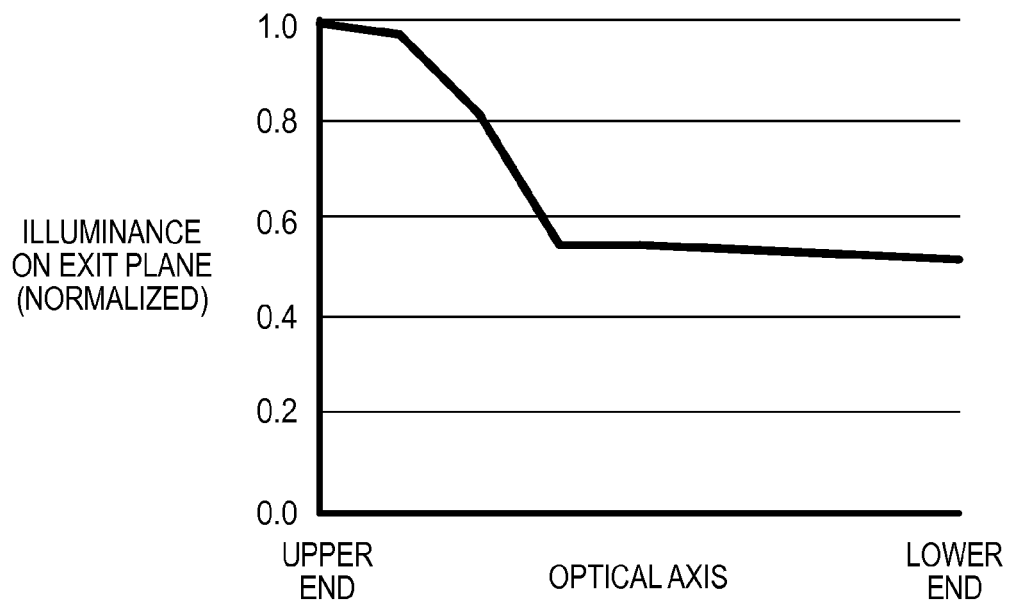
FIGS. 3A and 3B are graphs for explaining the first embodiment.
Figure 3B:
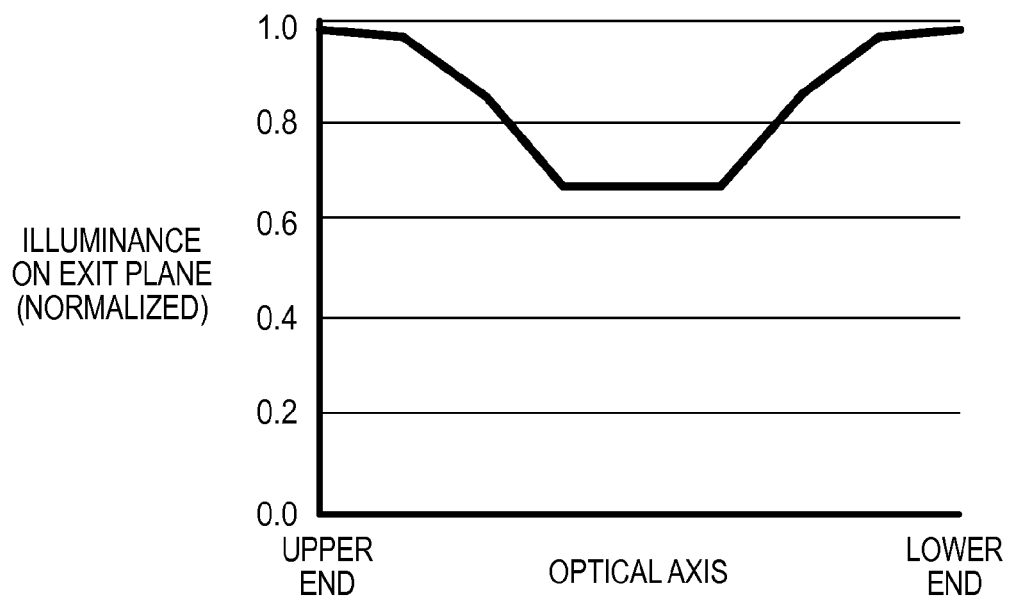

FIG. 3A shows the illuminance distribution formed on the exit plane 1032 of the optical member 103 by light that is emitted from the position close to the upper end of the area light source 102. FIG. 3B shows the illuminance distribution formed on the exit plane 1032 by light that is emitted from the position close to the upper end of the area light source 102 and light that is emitted from the position close to the lower end of the area light source 102. As shown in FIG. 3B, the illuminance distribution has a higher illuminance at the peripheral portion than at the central portion.

A condition advantageous in forming the illuminance distribution having a higher illuminance at the peripheral portion than at the central portion will be described below. Such an illuminance distribution is formed because the light that is emitted from the position close to the upper end of the area light source 102, enters the entrance plane 1031, and is reflected by a side surface of the optical member 103 reaches only a partial area of the exit plane 1032. A condition under which the light that is emitted from the position close to the upper end of the area light source 102, enters the entrance plane 1031, and is reflected by the side surface of the optical member 103 reaches only a partial area of the exit plane 1032 will be examined.

Figure 4:
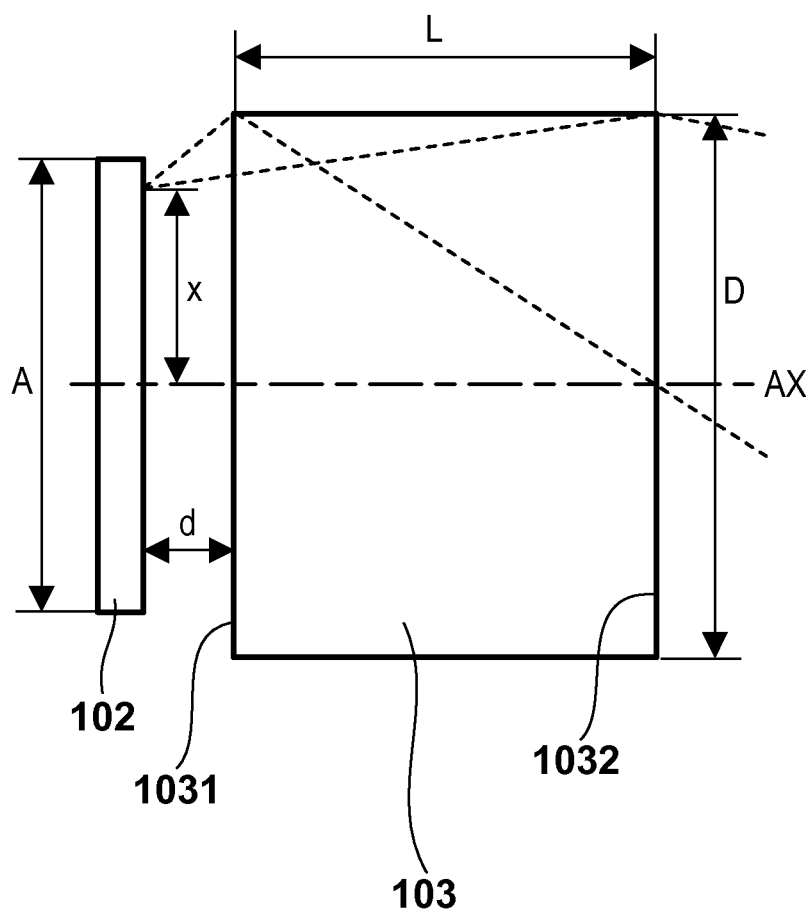
FIG. 4 is a view for explaining the first embodiment.

As shown in FIG. 4, let A be the length of the short side of the rectangular area light source 102, d be the equivalent air distance between the area light source 102 and the entrance plane 1031 of the optical member 103, and D be the length of the short side of the entrance plane 1031 of the optical member 103. Also let L be the length of the optical member 103 (the distance between the entrance plane 1031 and the exit plane 1032), and n be the refractive index. As for light that is emitted from a given position of the area light source 102 and reflected by a side surface of the optical member 103 only once, and reaches the whole area of the upper half (the area on the upper side of an optical axis AX) of the exit plane 1032 of the optical member 103, a distance x of the position from the optical axis AX meets $$x = D/2 - n \cdot d \cdot D/(2L) \quad (1)$$

When the distance x is larger than $(D/2 - n \cdot d \cdot D/(2L))$, the light reflected only once reaches only a partial upper area of the upper half of the exit plane 1032 of the optical member 103. This contributes to making the illuminance at the peripheral portion of the exit plane 1032 higher than that at the central portion. Decreasing the length L (the distance between the entrance plane 1031 and the exit plane 1032) of the optical member 103 also contributes to making the illuminance at the peripheral portion of the exit plane 1032 higher than that at the central portion.

Figure 13:
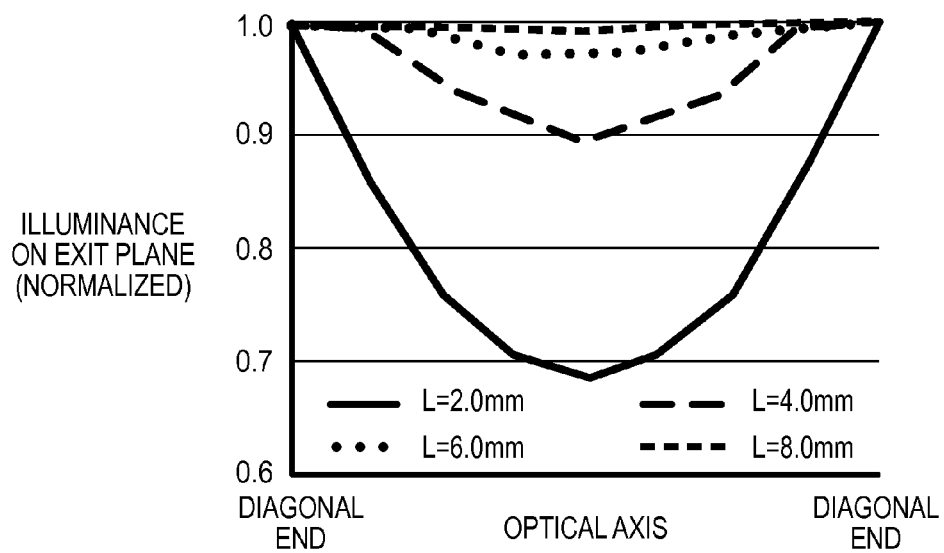
FIG. 13 is a graph for explaining the first embodiment.

FIG. 13 shows illuminance distributions obtained in a diagonal direction of the exit plane 1032 of the optical member 103 when the length of the optical member 103 is changed to 2, 4, 6, and 8 mm. Since the light falloff at edges of the projection lens of the projector is generally 5% or more, the illuminance at the peripheral portion of the exit plane 1032 of the optical member 103 is preferably higher than the illuminance at the central portion by 5% or more. Hence, the length of the optical member 103 is preferably 4 mm or less, as can be seen from FIG. 13. When $$\alpha = L(D-A)/(n \cdot d \cdot D) \quad (2)$$

L and α hold a relationship as shown in Table 1.

TABLE 1

| | L | | | |
|---|---|---|---|---|
| | 2 | 4 | 6 | 8 |
| α | 0.15 | 0.29 | 0.44 | 0.59 |

As shown in Table 1, when α is 0.3 or less, the illuminance at the peripheral portion of the exit plane 1032 of the optical member 103 becomes higher than the illuminance at the central portion by 5% or more. Hence, based on equation (2), the optical member 103 preferably meets $$D/2 - 0.3n \cdot d \cdot D/(2L) \le A/2 \quad (3)$$

When D, A, n, and d in the first design example are substituted into expression (3), L≤4.1 mm. Since the length L of the optical member 103 is 3 mm, the first design example meets expression (3).

Figure 5:
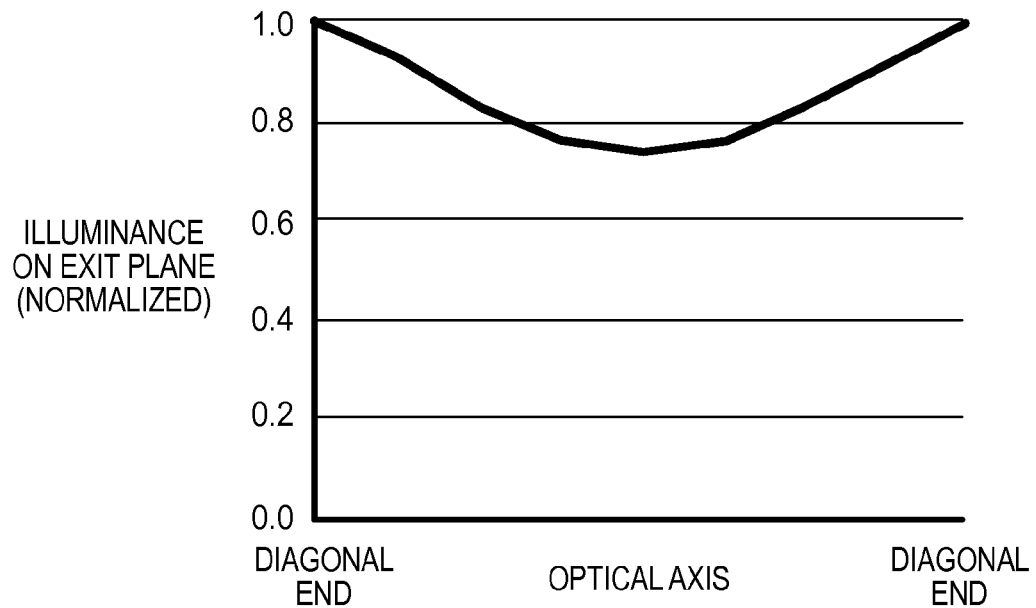
FIG. 5 is a graph for explaining the first embodiment.

In the first design example, an illuminance distribution as shown in FIG. 5 is formed in the diagonal direction of the exit plane 1032 of the optical member 103. The illuminance is lower at the central portion than at the peripheral portion by about 25%.

As described above, in the first embodiment, the length of the optical member 103 is decreased, thereby forming an illuminance distribution on the exit plane 1032 of the optical member 103 in which the illuminance at the peripheral portion is higher than that at the central portion. For this reason, the illuminance distribution on the spatial light modulator 106 also has a higher illuminance at the peripheral portion than at the central portion. This makes it possible to reduce the light falloff at edges which occurs in the image projected by the projection lens 107 due to the characteristic of the projection lens 107.

In a system that captures the projected image by a camera, light falloff at edges is caused by the image capturing lens of the camera as well. Hence, the projected image preferably has a higher brightness at the peripheral portion than at the central portion. In this case, since the light falloff at edges of the image capturing lens of the camera is also generally 5% or more, the illuminance at the peripheral portion of the exit plane 1032 of the optical member 103 is preferably higher than the illuminance at the central portion by 15%. At this time, a is 0.2. Hence, the illuminance on the exit plane 1032 of the optical member 103 is preferably made higher by changing the condition of expression (3) to $$D/2 - 0.2n \cdot d \cdot D/(2L) \leq A/2 \qquad (4)$$

In the first embodiment, the length A of the short side of the rectangular area light source 102 is smaller than the length D of the short side of the entrance plane 1031 of the optical member 103. However, the length A of the short side of the rectangular area light source 102 may equal the length D of the short side of the entrance plane 1031 of the optical member 103. Otherwise, the length A of the short side of the rectangular area light source 102 may almost equal the length D of the short side of the entrance plane 1031 of the optical member 103 (for example, the ratio of A to D is 0.9 (inclusive) to 1.1 (inclusive)). At this time, α is 0. A condition under which the illuminance at the peripheral portion of the exit plane 1032 of the optical member 103 becomes higher than at the central portion will be examined. When Table 1 is changed to the relationship between L and x/A, Table 2 is obtained.

TABLE 2

|     | L    |      |      |      |
|-----|------|------|------|------|
|     | 2    | 4    | 6    | 8    |
| x/A | 0.14 | 0.35 | 0.42 | 0.46 |

As shown in Table 2, when x/A is 0.35 or less, the illuminance at the peripheral portion of the exit plane 1032 of the optical member 103 becomes higher than the illuminance at the central portion by 5% or more. Hence, x preferably meets $$x \leq 0.35A \qquad (5)$$

From expressions (1) and (5), the optical member 103 preferably meets $$L \leq n \ d/0.3 \qquad (6)$$

In the first embodiment, the length of the optical member 103 is decreased, thereby forming an illuminance distribution on the exit plane 1032 of the optical member 103 in which the illuminance at the peripheral portion is higher than that at the central portion. However, when the optical member 103 is too short, reflection by the side surface of the optical member 103 decreases, and the influence of the radiation angle distribution of the area light source 102 on the illuminance distribution on the exit plane 1032 of the optical member 103 becomes large. In the radiation angle distribution of the area light source, generally, the intensity is high at a radiation angle of 0°, and lowers along with an increase in the radiation angle. Hence, when the optical member 103 is too short, the illuminance distribution on the exit plane 1032 readily has a higher illuminance at the central portion than at the peripheral portion. To prevent this, the light from the end of the area light source 102 is preferably reflected by the side surface of the optical member 103 at least once and reaches the whole area of the exit plane 1032. This can be achieved by meeting $$L \geq 2n \ d \cdot D/(D+A) \qquad (7)$$

When D, A, n, and d in the first design example are substituted into expression (7), L≤1.6 mm. Since the length L of the optical member 103 is 3 mm, the first design example meets expression (7).

In the first design example, the equivalent air distance d between the area light source 102 and the optical member 103 is 1 mm. Light beams at an angle of 50° or more from the center of the area light source 102 can be received. When the equivalent air distance d between the area light source 102 and the optical member 103 is short, a larger amount of light from the area light source 102 can be received even if the entrance plane 1031 of the optical member 103 is small. Hence, the equivalent air distance d between the area light source 102 and the optical member 103 is preferably ½ or less of the short side of the optical member 103.

Figure 6:
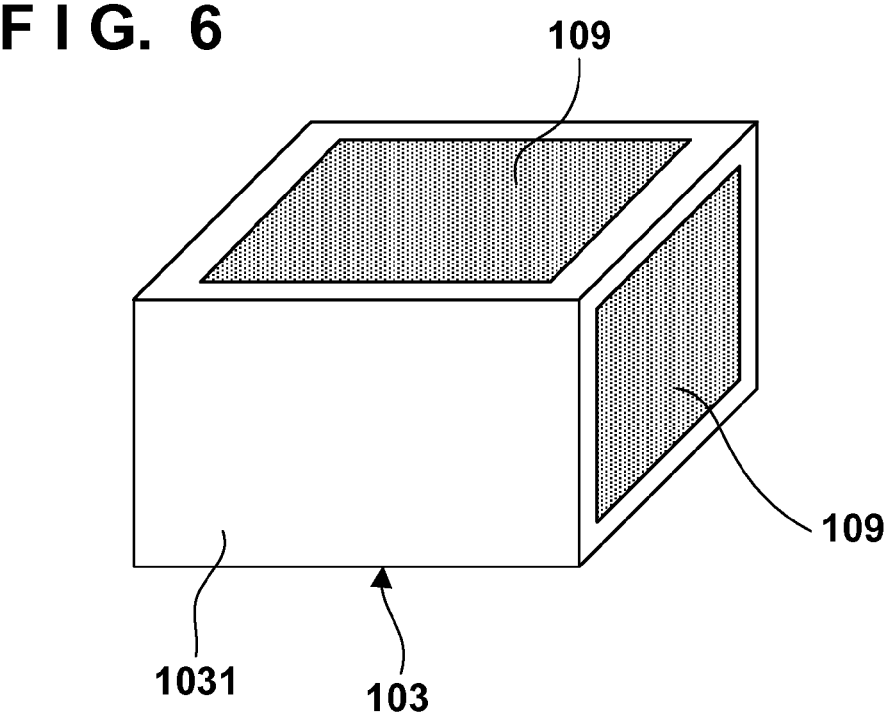
FIG. 6 is a perspective view showing a modification of the first embodiment.

The optical member 103 can have either a solid structure or a hollow structure. As shown in FIG. 6, the optical member 103 may include reflecting films 109 provided on the side surfaces. If no reflecting film 109 is provided on the side surfaces of the optical member 103, the light is not reflected at all by a portion where the optical member 103 and a holding member holding the optical member are in contact with each other, resulting in a loss. When the reflecting film 109 is provided, and the holding member holds the optical member 103 at the portion where the reflecting film 109 exists, the loss can be reduced.

As shown in FIG. 6, the reflecting film 109 is not provided all over each side surface of the optical member 103, that is, each side surface of the optical member 103 may include a first portion where the reflecting film 109 is provided and a second portion where the reflecting film is not provided. In this case, a holding member 110 as shown in FIG. 7A is preferably employed to hold the optical member 103 at the first portions out of the first portions and the second portions, as shown in FIG. 7B.

The aspect ratio (length of long side:length of short side) of the exit plane 1032 of the optical member 103 is preferably the same as that of the spatial light modulator 106. This obviates the necessity of using an anamorphic lens as the relay lens 104, and the manufacturing cost of the illumination system 150 can be reduced. The aspect ratio of the exit plane 1032 of the optical member 103 and that of the spatial light modulator 106 can be, for example, 4:3.

The spatial light modulator 106 may be a transmissive or reflective liquid crystal display device. In this case, light that enters the liquid crystal display device and light that exits from the liquid crystal display device can be separated using a PBS (Polarization Beam Splitter) in place of the TIR prism.

Figure 8:
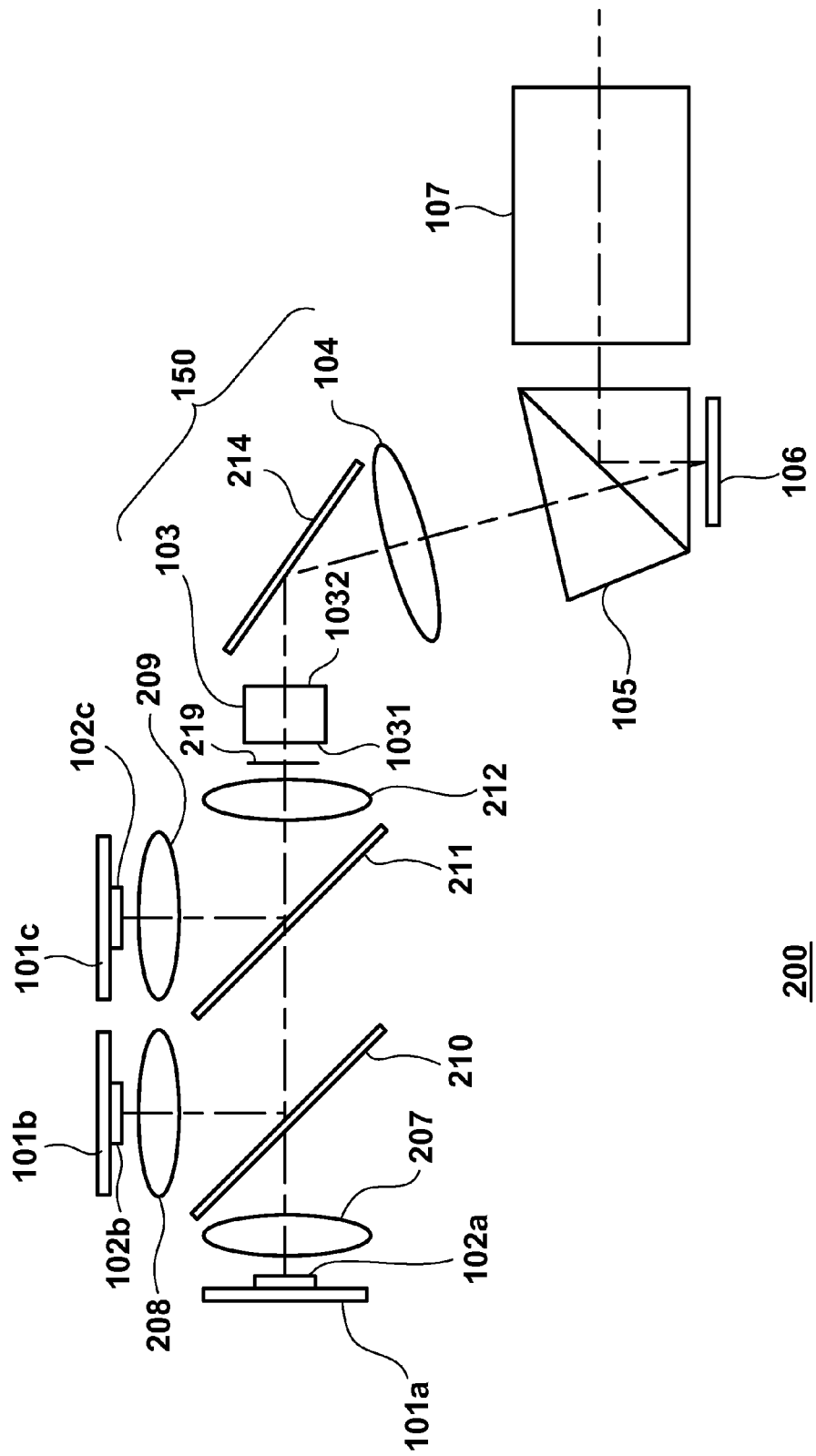
FIG. 8 is a view showing the schematic arrangement of a projector according to the second embodiment.

FIG. 8 shows the schematic arrangement of a projector 200 according to the second embodiment of the present invention. Matters that are not mentioned in the second embodiment can comply with the first embodiment. In the second embodiment, the first embodiment is applied to a color projector.

The projector 200 can include first area light sources 102a to 102c, a spatial light modulator 106, and an illumination system 150 that receives light from the images of the first area light sources 102a to 102c, which serve as a second area light source 219, and illuminates the spatial light modulator 106. The projector 200 can also include a projection lens 107 that forms an image by the light from the spatial light modulator 106.

The first area light sources 102a to 102c can be, for example, the light emitting regions of light emitting devices 101a to 101c such as LEDs. The first area light source 102a is a blue (B) area light source, the area light source 102b is a green (G) area light source, and the area light source 102c is a red (R) area light source. Each of the first area light sources 102a to 102c has, for example, a rectangular shape. Light from the blue area light source 102a is condensed by a lens 207, light from the green area light source 102b is condensed by a lens 208, and light from the red area light source 102c is condensed by a lens 209. A dichroic mirror 210 transmits light from the blue area light source 102a and reflects light from the green area light source 102b. A dichroic mirror 211 transmits light from the dichroic mirror 210 and reflects light from the red area light source 102c. A lens 212 condenses light from the dichroic mirror 211 and forms the images of the first area light sources 102a to 102c (the images of the light emitting regions of the light emitting devices 101a to 101c) as the second area light source 219.

The spatial light modulator 106 can be, for example, a device such as a DMD. The illumination system 150 can include an optical member 103, a deflecting mirror 214, and a relay lens 104. The optical member 103 has a cuboid shape and includes an entrance plane 1031 and an exit plane 1032. The optical member 103 is arranged while making the entrance plane 1031 face the area light source 102, and forms, on the exit plane 1032, an illuminance distribution having a higher illuminance at the peripheral portion than at the central portion. The relay lens 104 illuminates the spatial light modulator 106 with the light from the exit plane 1032 of the optical member 103. The projection lens 107 projects the light from the spatial light modulator 106 onto a screen or the like.

The projector 200 may include a TIR prism 105. The TIR prism 105 is formed by bonding two triangular prisms at a very small air gap. The TIR prism 105 transmits light from the relay lens 104, and reflects the light reflected by the spatial light modulator 106 by the interface between the two triangular prisms.

In the second design example that is one design example of the second embodiment, the size of each of the first area light sources 102a to 102c is 3.2×2.4 mm. In addition, the size of the image of each of the first area light sources 102a to 102c serving as the second area light source 219 formed by the lenses 207 and 212 is 3.2×2.4 mm. The size of the entrance plane 1031 of the optical member 103 is 3.6×2.7 mm, the length of the optical member 103 (the distance between the entrance plane 1031 and the exit plane 1032) is 3 mm, and the refractive index of the optical member 103 is 1.517. The equivalent air distance between the second area light source 219 and the optical member 103 is 1 mm.

When D, A, n, and d in the second design example are substituted into expression (3), L≤4.1. Since a length L of the optical member 103 is 3 mm, the second design example meets expression (3).

In the second embodiment as well, the length of the optical member 103 is decreased, thereby forming an illuminance distribution on the exit plane 1032 of the optical member 103 in which the illuminance at the peripheral portion is higher than that at the central portion. For this reason, the illuminance distribution on the spatial light modulator 106 also has a higher illuminance at the peripheral portion than at the central portion. This makes it possible to reduce the light falloff at edges which occurs in the image projected by the projection lens 107 due to the characteristic of the projection lens 107.

In the second embodiment, the deflecting mirror 214 arranged in the optical path between the optical member 103 and the projection lens 107 makes the optical axis of the optical member 103 parallel to that of the projection lens 107.

This simplifies the positional relationship between the area light sources 102a to 102c, the optical member 103, and the projection lens 107, and facilitates the design and manufacturing of the case storing these members, resulting in a lower manufacturing cost. In the second embodiment, the optical axis of the optical member 103 is made parallel to that of the projection lens 107. However, the deflecting mirror 214 may be arranged to make the optical axes perpendicular to each other.

Figure 9:
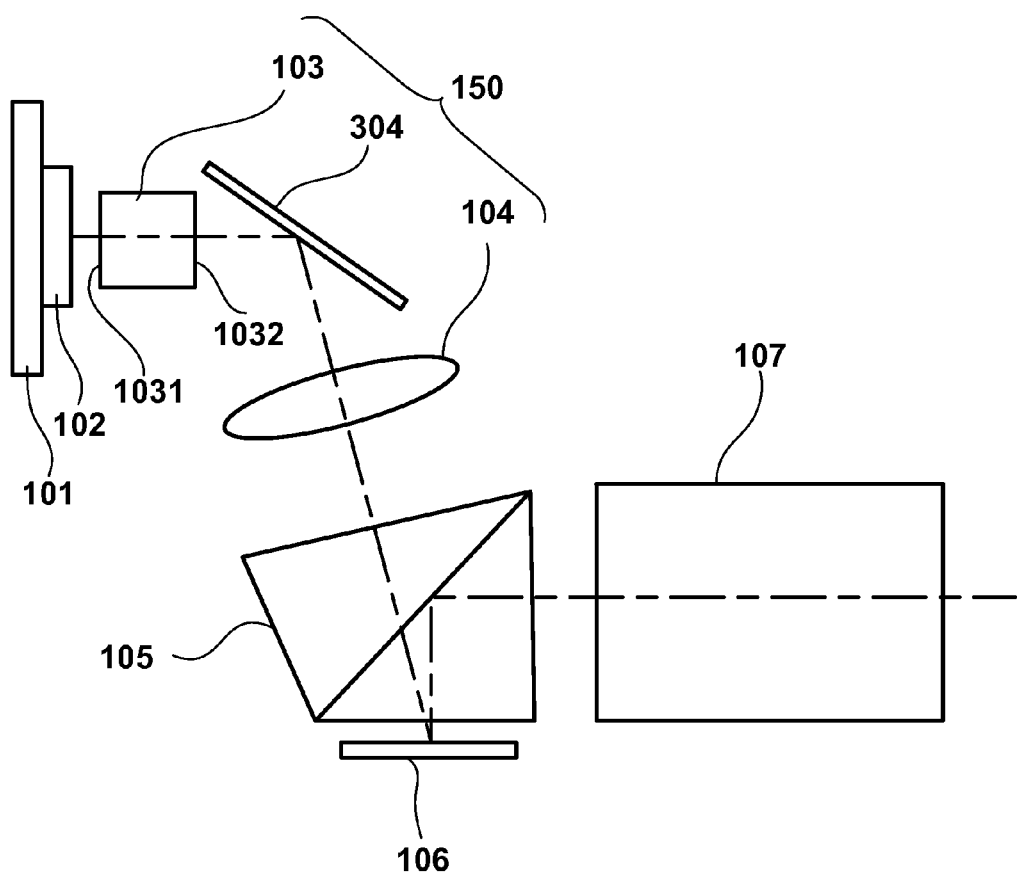
FIG. 9 is a view showing the schematic arrangement of a projector according to the third embodiment.

FIG. 9 shows the schematic arrangement of a projector 300 according to the third embodiment of the present invention. Matters that are not mentioned in the third embodiment can comply with the first embodiment. The projector 300 can include an area light source 102, a spatial light modulator 106, an illumination system 150 that receives light from the area light source 102 and illuminates the spatial light modulator 106, and a projection lens 107 that forms an image by the light from the spatial light modulator 106.

The area light source 102 can be, for example, the light emitting region of a light emitting device 101 such as an LED but may be the image of the light emitting region. The image of the light emitting region can be formed at a position (image plane) conjugate to the light emitting region (object plane) of the light emitting device 101 by an optical system (not shown). The area light source 102 has, for example, a rectangular shape. The spatial light modulator 106 can be, for example, a device such as a DMD. The illumination system 150 can include an optical member 103, a deflecting mirror 304, and a relay lens 104. The optical member 103 has a cuboid shape and includes an entrance plane 1031 and an exit plane 1032. The optical member 103 is arranged while making the entrance plane 1031 face the area light source 102, and forms, on the exit plane 1032, an illuminance distribution having a higher illuminance at the peripheral portion than at the central portion. The relay lens 104 illuminates the spatial light modulator 106 with the light from the exit plane 1032 of the optical member 103. The projection lens 107 projects the light from the spatial light modulator 106 onto a screen or the like.

The projector 300 may include a TIR prism 105. The TIR prism 105 is formed by bonding two triangular prisms at a very small air gap. The TIR prism 105 transmits light from the relay lens 104, and reflects the light reflected by the spatial light modulator 106 by the interface between the two triangular prisms.

In the third design example that is one design example of the third embodiment, the size of the area light source 102 is 5.4×4.1 mm, and the size of the entrance plane 1031 of the optical member 103 is 3.6×2.7 mm. In addition, the length of the optical member 103 (the distance between the entrance plane 1031 and the exit plane 1032) is 2 mm, the refractive index of the optical member 103 is 1.517, and the equivalent air distance between the area light source 102 and the optical member 103 is 1 mm.

Since D<A, the third design example meets expression (3). Hence, out of light that is emitted by the area light source 102, light components reflected by a side surface of the optical member 103 only once reach only the peripheral portion of the exit plane 1032 of the optical member 103. Hence, the illuminance distribution on the exit plane 1032 of the optical member 103 has a higher illuminance at the peripheral portion than at the central portion.

Figure 10A:
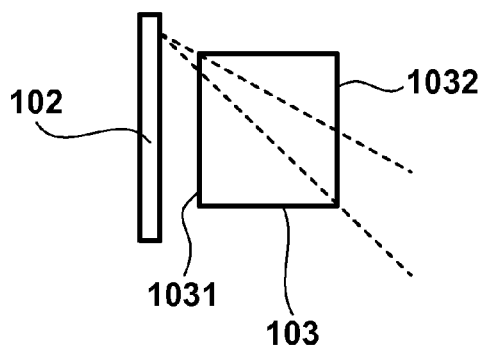
FIGS. 10A and 10B are views for explaining the third embodiment.

However, when the area light source 102 is larger than the entrance plane 1031 of the optical member 103, as in the third embodiment, light components that are emitted from a position close to the upper end of the area light source 102 and not reflected by any side surface of the optical member 103 at all pass routes as shown in FIG. 10A. As can be seen from FIG. 10A, light that is emitted from the position close to the upper end of the area light source 102 reaches only the lower region of the exit plane 1032 of the optical member 103. For this reason, the light that is emitted from the position close to the upper end of the area light source 102 overlaps light that is reflected only once by the side surface of the optical member 103 and reaches only the upper region of the exit plane 1032 of the optical member 103 shown in FIG. 10B, and uniforms the illuminance on the exit plane 1032.

A condition under which the illuminance distribution on the exit plane 1032 of the optical member 103 has a higher illuminance at the peripheral portion than at the central portion when the area light source 102 is larger than the entrance plane 1031 of the optical member 103 will be examined.

Figure 11:
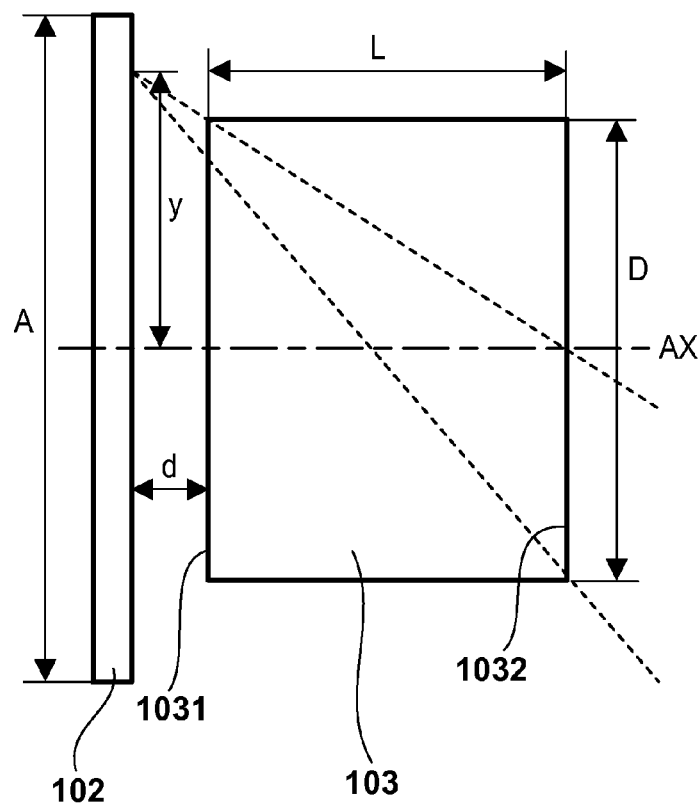
FIG. 11 is a view for explaining the third embodiment.

As shown in FIG. 11, let A be the length of the short side of the rectangular area light source 102, d be the equivalent air distance between the area light source 102 and the optical member 103, and D be the length of the short side of the exit plane 1032 of the optical member 103. Also let L be the length of the optical member 103 (the distance between the entrance plane 1031 and the exit plane 1032), and n be the refractive index. As for light that is emitted from a given position of the area light source 102, not reflected by a side surface of the optical member 103 at all, and reaches the whole area of the lower half region of the exit plane 1032 of the optical member 103, a distance y of the position from an optical axis AX meets $$y = D/2 + n \cdot d \cdot D/(2L) \tag{8}$$

Figure 10B:
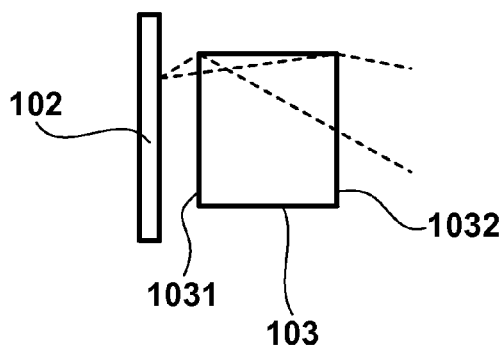

Light that meets expression (8) overlaps the light that reaches only the upper region, as shown in FIG. 10B, and uniforms the illuminance on the exit plane 1032. On the other hand, as the distance y becomes larger than ($D/2 + n \cdot d \cdot D/(2L)$), the amount of light that is not reflected by the side surface of the optical member 103 at all and reaches only the lower half region of the exit plane 1032 of the optical member 103 decreases. This weakens the effect of uniforming the illuminance, as shown in FIG. 10A, and conversely enhances the effect of raising the illuminance at the peripheral portion, as shown in FIG. 10B.

FIG. 14 shows illuminance distributions obtained in a diagonal direction of the exit plane 1032 of the optical member 103 when the length of the optical member 103 is changed to 1, 2, 3, and 4 mm. Since the light falloff at edges of the projection lens of the projector is generally 5% or more, the illuminance at the peripheral portion of the exit plane 1032 of the optical member 103 is preferably higher than the illuminance at the central portion by 5% or more. Hence, the length of the optical member 103 is preferably 3 mm or less, as can be seen from FIG. 14. When $$\beta = L(A-D)/(n \cdot d \cdot D) \tag{9}$$

L and β hold a relationship as shown in Table 3.

TABLE 3

| | L | | | |
|---|---|---|---|---|
| | 1 | 2 | 3 | 4 |
| β | 0.34 | 0.68 | 1.0 | 1.4 |

As shown in Table 3, when β is 1 or less, the illuminance at the peripheral portion of the exit plane 1032 of the optical member 103 becomes higher than the illuminance at the central portion by 5% or more. Hence, based on equation (9), the optical member 103 preferably meets $$A/2 \le D/2 + n \cdot d \cdot D/(2L) \tag{10}$$

Figure 12:
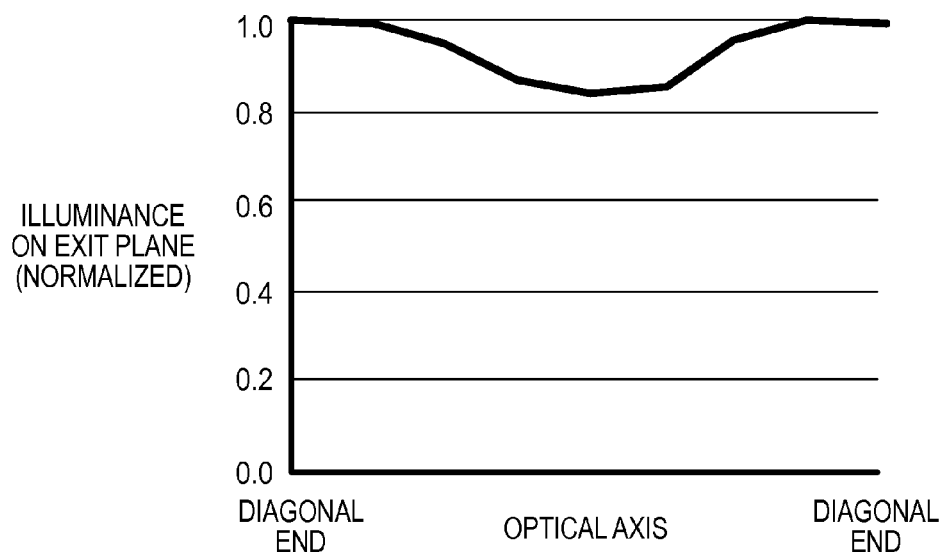
FIG. 12 is a graph for explaining the third embodiment.

When D, A, n, and d in the third design example are substituted into expression (10), L≤3.1. Since the length L of the optical member 103 is 2 mm, the third design example meets expression (10). In the third design example, an illuminance distribution as shown in FIG. 12 is formed in the diagonal direction of the exit plane 1032 of the optical member 103. The illuminance is lower at the central portion than at the peripheral portion by about 15%.

In the third embodiment as well, the length of the optical member 103 is decreased, thereby forming an illuminance distribution on the exit plane 1032 of the optical member 103 in which the illuminance at the peripheral portion is higher than that at the central portion. For this reason, the illuminance distribution on the spatial light modulator 106 also has a higher illuminance at the peripheral portion than at the central portion. This makes it possible to reduce the light falloff at edges which occurs in the image projected by the projection lens 107 due to the characteristic of the projection lens 107.

From the relationship between expressions (3) and (10), the size of the area light source 102 need only meet $$D/2 - 0.3n \cdot d \cdot D/(2L) \le A/2 \le D/2 + n \cdot d \cdot D/(2L) \tag{11}$$

Expression (11) indicates that the size of the area light source 102 has a lower limit so that the light reflected once, which contributes to improvement of the peripheral light amount, is obtained in a predetermined amount or more, and the size of the area light source 102 also has an upper limit so that the light reflected not at all, which cancels the improvement of the peripheral light amount, is obtained in a predetermined amount or less.

As described above, to make the illuminance at the peripheral portion higher than that at the central portion in the illuminance distribution on the exit plane 1032 of the optical member 103, expression (11) is rewritten, and thus obtained $$D - 0.3n \cdot d \cdot D/L \le A \le D + n \cdot d \cdot D/L \tag{12}$$

is met.

Expression (4) can also be rewritten as $$D - 0.2n \cdot d \cdot D/L \le A \tag{13}$$

In the third embodiment, the deflecting mirror 304 arranged in the optical path between the optical member 103 and the projection lens 107 makes the optical axis of the optical member 103 parallel to that of the projection lens 107, as in the second embodiment. This simplifies the positional relationship between the area light source 102, the optical member 103, and the projection lens 107, and facilitates the design and manufacturing of the case storing these members, resulting in a lower manufacturing cost. In the third embodiment, the optical axis of the optical member 103 is made parallel to that of the projection lens 107. However, the deflecting mirror 304 may be arranged to make the optical axes perpendicular to each other.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-288563, filed Dec. 28, 2012, which is hereby incorporated by reference herein in its entirety.

What is claimed is:
1. A projector comprising:
an area light source;

a spatial light modulator;

an illumination system that receives light from the area light source and illuminates the spatial light modulator;

and a projection lens that forms an image by the light from the spatial light modulator, wherein the illumination system includes an optical member that (a) has a cuboid shape and (b) includes an entrance plane and an exit plane, the optical member being arranged so that the entrance plane faces the area light source, and the optical member forming, on the exit plane, an illuminance distribution having a higher illuminance at a peripheral portion than at a central portion, wherein the spatial light modulator is illuminated with the light from the exit plane, wherein the area light source is rectangular, and wherein, where D is a length of a short side of the entrance plane of the optical member, L is a distance between the entrance plane and the exit plane of the optical member, A is a length of a short side of the area light source, n is a refractive index of the optical member, and d is an equivalent air distance between the area light source and the entrance plane, $$D - 0.3 n \cdot d \cdot D/L \leq A \leq D + n \cdot d \cdot D/L$$

is met.

2. The projector according to claim 1, wherein the area light source comprises one of a light emitting region of a light emitting device, and an image of the light emitting region.

3. The projector according to claim 1, wherein an equivalent air distance between the area light source and the entrance plane is not more than ½ of a short side of the entrance plane.

4. The projector according to claim 1, wherein $$D - 0.2 n \cdot d \cdot D/L \leq A$$

is met.

5. The projector according to claim 1, wherein $$L \geq 2 n \cdot d \cdot D/(D+A)$$

is met.

6. The projector according to claim 1, wherein a reflecting film is provided on a side surface of the optical member.

7. The projector according to claim 1, wherein a side surface of the optical member includes a first portion where a reflecting film is provided and a second portion where the reflecting film is not provided, and wherein the optical member is held by a holding member at the first portion out of the first portion and the second portion.

8. The projector according to claim 1, further comprising a deflecting mirror arranged in an optical path between the optical member and the projection lens.

* * * * *